US007784841B2

(12) United States Patent
Watson et al.

(10) Patent No.: US 7,784,841 B2
(45) Date of Patent: Aug. 31, 2010

(54) DOOR ACCESS HANDLE WITH INTEGRATED LOCK-OUT FUNCTION

(75) Inventors: Scott Watson, Farmington Hills, MI (US); David Kovie, Farmington Hills, MI (US); Adam Tacey, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 661 days.

(21) Appl. No.: 11/611,534

(22) Filed: Dec. 15, 2006

(65) Prior Publication Data

US 2008/0143124 A1 Jun. 19, 2008

(51) Int. Cl.
*E05B 3/00* (2006.01)
*B60J 10/08* (2006.01)

(52) U.S. Cl. ........................ 292/336.3; 292/32; 292/40; 292/44; 292/52; 292/DIG. 31; 296/146.9

(58) Field of Classification Search .................. 292/32, 292/34, 36–38, 40, 42, 44, 48, 49, 50, 52, 292/54, 336.3, DIG. 21, DIG. 46, DIG. 31; 49/366, 503; 296/146.9
See application file for complete search history.

(56) References Cited

U.S. PATENT DOCUMENTS

| | | | | |
|---|---|---|---|---|
| 243,374 | A * | 6/1881 | Howard | 292/48 |
| 1,869,274 | A * | 7/1932 | Phillips | 49/365 |
| 2,104,838 | A * | 1/1938 | Leonard | 292/1 |
| 2,239,301 | A * | 4/1941 | Papst | 292/1 |
| 2,246,708 | A * | 6/1941 | Wieben | 70/208 |
| 2,265,434 | A * | 12/1941 | Kibbey | 296/16 |
| 2,387,187 | A * | 10/1945 | Smith | 70/97 |
| 2,822,203 | A | 2/1958 | Griswold, Jr. et al. | |
| 2,827,321 | A | 3/1958 | Leslie et al. | |
| 2,833,582 | A * | 5/1958 | Henrichs | 292/336.3 |
| 3,683,652 | A * | 8/1972 | Halopoff et al. | 70/467 |
| 4,900,088 | A * | 2/1990 | Bechtle et al. | 297/378.12 |
| 4,930,836 | A * | 6/1990 | Grinn | 296/146.11 |
| 5,749,611 | A * | 5/1998 | Watson et al. | 292/336.3 |
| 6,059,352 | A * | 5/2000 | Heldt et al. | 296/146.6 |
| 6,309,008 | B1 * | 10/2001 | Bacon | 296/106 |
| 6,343,494 | B2 * | 2/2002 | Roos et al. | 70/264 |
| 6,550,845 | B1 | 4/2003 | Pietryga | |

(Continued)

FOREIGN PATENT DOCUMENTS

DE 3805539 A1 * 8/1989

*Primary Examiner*—Carlos Lugo
(74) *Attorney, Agent, or Firm*—Young Basile

(57) ABSTRACT

A vehicle has a door release apparatus for a first door supporting a door latch for a second door. A first door latch connects the first door with respect to a frame defining a vehicle body opening. A handle member has at least an inboard portion and is mounted to the first door for movement about an axis. A force transmission assembly is operably engaged between the handle member and the first door latch for movement between a latch-engaged position and a latch-released position. A door release lock-out is defined by a portion of the second door directly obstructing movement of the handle member, when the second door is in the at least partially latched position. The door release lock-out prevents movement of the handle member a sufficient distance to release the first door latch from the frame when the second door is in the at least partially latched position.

29 Claims, 7 Drawing Sheets

U.S. PATENT DOCUMENTS 6,694,676 B2 2/2004 Sakamoto et al.
6,752,440 B2 * 6/2004 Spurr ...................... 292/336.3
6,779,831 B2 * 8/2004 Moriyama ............... 296/146.9
6,848,737 B2 2/2005 Mikolai et al.
6,964,440 B2 * 11/2005 Lebsack et al. .......... 292/336.3
7,000,976 B2 * 2/2006 Azzouz et al. ........... 296/146.1
7,182,392 B2 * 2/2007 Sawajiri .................. 296/146.1

* cited by examiner

DOOR ACCESS HANDLE WITH INTEGRATED LOCK-OUT FUNCTION

FIELD OF THE INVENTION

The present invention relates to an inner door handle for a dual door assembly through a passage opening defined by a frame through a barrier wall of a vehicle, the dual door assembly having first and second closure doors barring traffic through the passage opening and being mounted to opposite sides of the frame for independent movement between opened and closed positions, distal ends of the first and second closure doors engagable in seated relationship with respect to one another in the closed position, wherein the first or inner closure door has at least one latch engagable with the frame and supports a door latch for the second or outer closure door.

BACKGROUND OF THE INVENTION

Various access door configurations and release handles are known, for example U.S. Pat. Nos. 6,848,737; 6,694,676; 6,550,845; 2,827,321; and 2,822,203. While these configurations appear suitable for their intended purpose, it is desirable that the interior door handle be inoperable when the outer door is at least partially latched, because the stability and security of the outer door when at least partially latched depends on the inner door being closed and securely latched to the frame defining the opening through the vehicle. To this end, prior known configurations provide for a lever located adjacent to an external door handle to mechanically disable the door release function of the interior door handle. When the outer door is at least partially latched, a member covers the external door panel of the interior door and engages the lever. The lever causes an internal mechanical action within the interior door that decouples the internal door handle so that operation of the interior door handle will not cause the interior door to unlatch from the frame of the vehicle. While this configuration appears to be suitable for its intended purpose, the mechanism is unnecessarily complicated and costly to manufacture.

SUMMARY OF THE INVENTION

A door release apparatus according to an embodiment of the present invention can be made cost effectively, and in a more simple mechanical form than prior known devices. A vehicle can have a door release apparatus for a first or inner door supporting a door latch for a second or outer door. The first door can have a first door latch for connecting the first door with respect to a frame defining a vehicle body opening. The door release apparatus can be connected with the first door latch. The vehicle door release apparatus can include a handle member or assembly, acting as a single unitary member, having at least an inboard portion. The handle member can be mounted to the first door for movement about an axis between first and second positions. A force transmission assembly operably engages between the handle member and the first door latch for movement in response to movement of the handle member. The force transmission assembly is moveable between a latch-engaged position and a latch-released position. A door release lock-out is defined by a portion of the second door directly obstructing movement of the handle member, when the second door is in the at least partially latched position. The door release lock-out prevents sufficient movement of the handle member from releasing the first door latch when the second door is at least partially latched. The second or outer door only needs to be partially latched to the first or inner door in order to lock-out the door release function of the handle member of the first door.

An interior door release handle can be provided for a dual door assembly mounted in a passage opening defined by a frame through a barrier wall of a vehicle. The dual door assembly can have first and second closure doors barring traffic through the passage opening and being mounted to opposite sides of the frame for independent movement between opened and closed positions. Distal ends of the first and second closure doors are engagable in sealed relationship with respect to one another in the closed position. The first closure door can have at least one latch engagable with the frame and a door latch for the second closure door. The interior door release handle can include a handle member or assembly, acting or operating as a single unitary member, having at least an inboard portion, The handle can be mounted to the first closure door for movement about an axis between first and second positions. A force transmission assembly operably engages with the handle member for movement in response to movement of the handle member. The force transmission member is moveable between a latch-engaged position and a latch-released position for operating the at least one latch of the first closure door with respect to the frame. An integrated first door release lock-out is defined by a portion of the second closure door directly obstructing movement of the handle member, when the second door is in the at least partially latched position, The integrated first door release lock-out prevents sufficient movement of the handle member from being able to move the force transmission assembly from the latch-engaged position to the latch-released position in order to prevent the first door latch from being released from the frame of the vehicle when the second door is at least partially latched.

A vehicle dual door assembly can include first and second closure doors for barring traffic through a passage opening defined by a frame through a barrier wall of a vehicle. The first and second closure doors can be mountable to opposite sides of the frame for independent movement between opened and closed positions. Distal ends of the first and second closure doors are engagable in sealed relationship with respect to one another in the closed position. The first closure door can have at least one latch engagable with the frame and supports a door latch for the second closure door. A handle member or assembly, acting as a single unitary member, can have at least an inboard portion. The handle can be mounted to the first closure door for movement about an axis between first and second positions. A force transmission assembly operably engages with the handle member for movement in response to movement of the handle member. The force transmission member is moveable between a latch-engaged position and a latch-released position for operating the at least one latch of the first closure door with respect to the frame. An integrated first door release lock-out is defined by a portion of the second closure door directly obstructing movement of the handle member, when the second door is in the at least partially latched position. The integrated first door release lock-out prevents sufficient movement of the handle member from being able to move the force transmission assembly from the latch-engaged position to the latch-released position, in order to prevent the first door latch from being released from the frame of the vehicle when the second door is at least partially latched.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like pans throughout the several views, and wherein.

DETAILED DESCRIPTION

Figure 1:
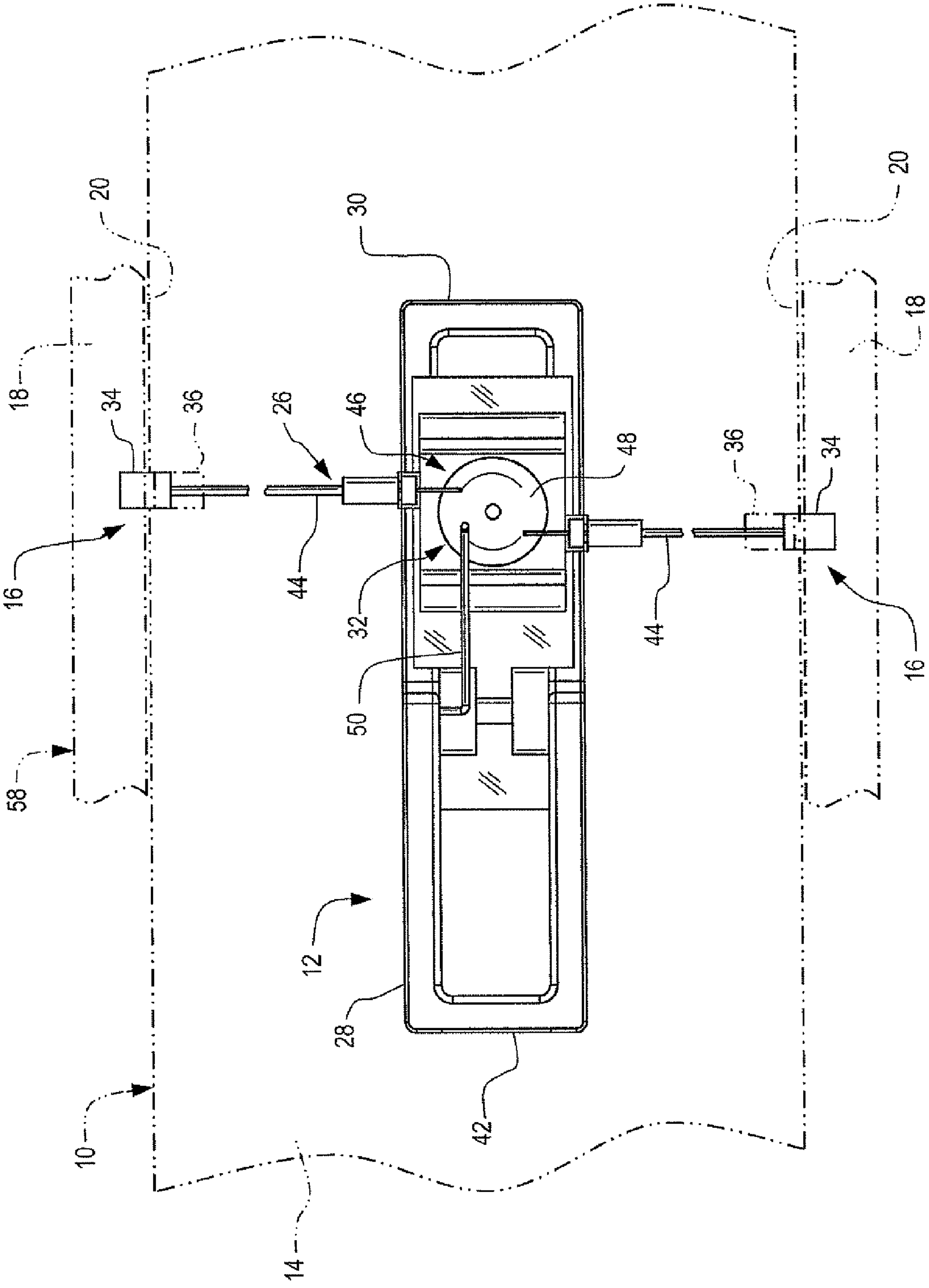
FIG. 1 is an elevational view of a door release apparatus or interior door release handle according to an embodiment of the present invention.
Figure 2:
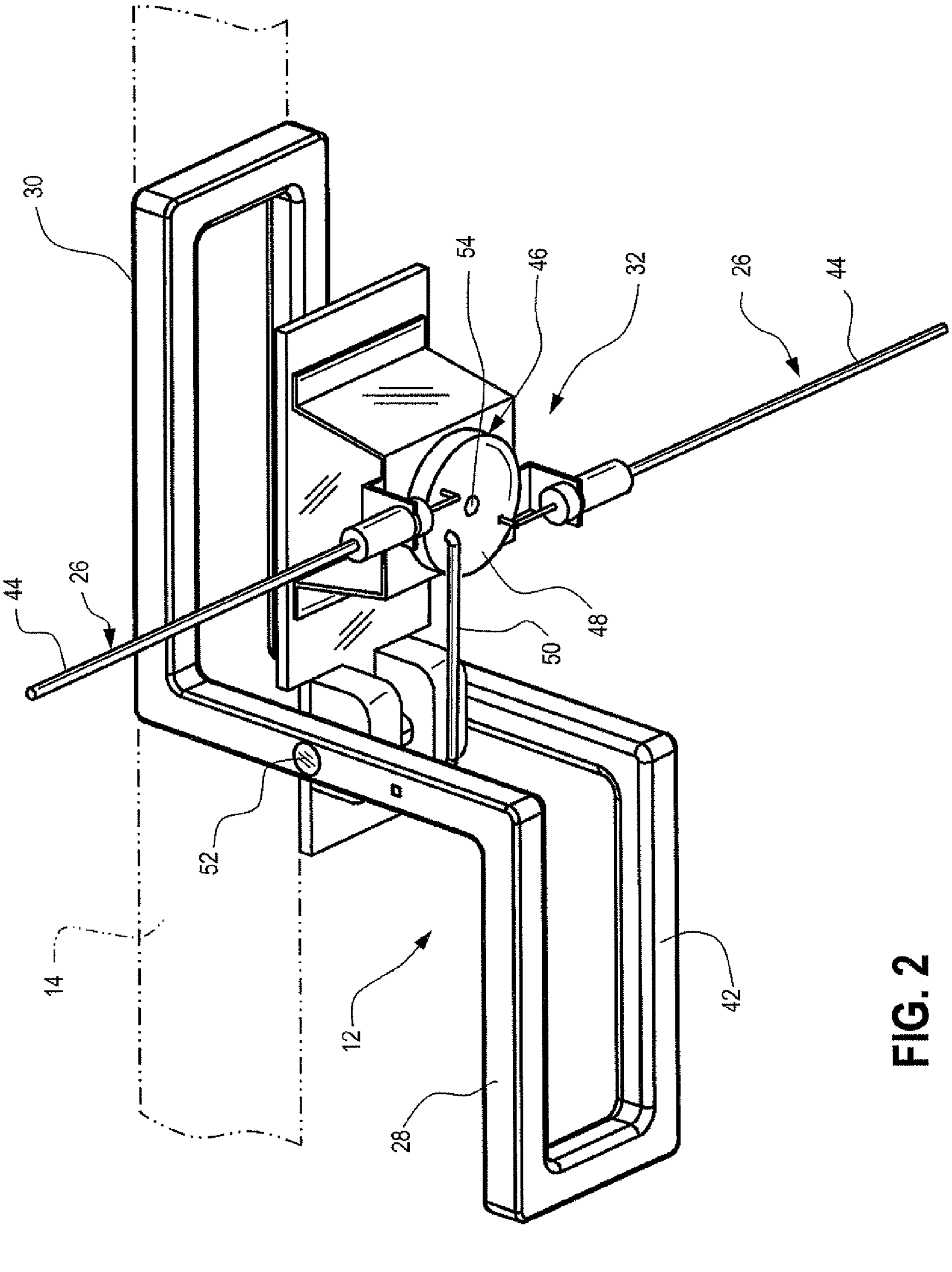
FIG. 2 is a perspective view of the interior door release handle illustrated in FIG. 1.
Figure 3:
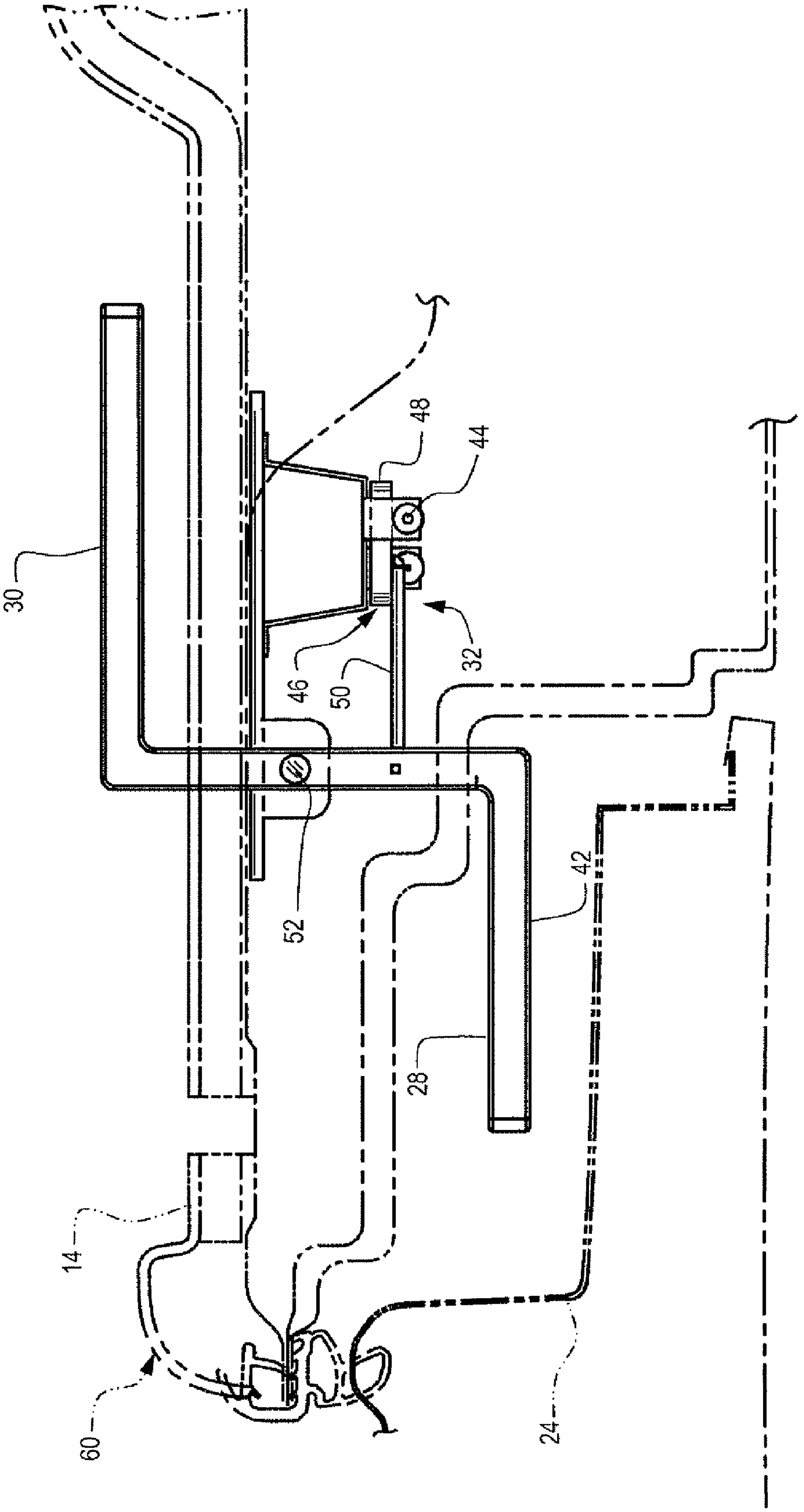
FIG. 3 is a plan view of the interior door release handle illustrated in FIGS. 1 and 2.

Referring now to FIGS. 1-3, a vehicle 10 is illustrated having an interior door release apparatus or interior door release handle 12. The interior door release apparatus or handle 12 is operably associated with a first closure door 14. The first closure door 14 has a first door latch 16 for connecting the first closure door 14 with respect to a frame 18 defining a vehicle body opening 20. The first closure door 14 supports a door latch 22 (best seen in FIG. 4) for a second closure door 24. The door release apparatus 12 is connected by a force transmission member 26 with the first door latch 16. A handle member 28 is mounted to the first closure door 14 for movement about an axis between first and the second positions. The handle member 28 has at least an inboard or interior portion 30. The force transmission assembly 32 is operably engaged between the handle member 28 and the first door latch 16 for movement in response to movement of the handle member 28. The force transmission assembly 32 is moveable between a latch-engaged position 34 and a latch-released position 36. A door release lock-out 38 is defined by a portion 40 of the second closure door 24 directly obstructing movement of the handle member 28, when the second closure door 24 is in the at least partially latched position. The door release lock-out 38 prevents sufficient movement of the handle member 28 from releasing the first door latch 16 when the second closure door 24 is in the closed position, fully latched or at least partially latched with respect to the first closure door 14.

The inboard portion 30 of the handle member 28 can be operable from within the vehicle 10 to unlatch the first closure door 14 when the second closure door 24 is in an open position. The handle member 28 can include an outboard or exterior portion 42 operable from external of the vehicle 10 to unlatch the first closure door 14 when the second closure door 24 is in the open position. The handle member 28 can be mounted for movement about an axis extending generally vertically with respect to the vehicle as illustrated in FIGS. 1-3, or about an axis of movement extending generally horizontally with respect to the vehicle as illustrated in FIGS. 4-7, or any angular orientation therebetween provided that the door release lock-out 38 is defined by a portion 40 of the second closure door 24 directly obstructing movement of the handle member 28 when the second closure door 24 is in the at least partially latched position. The obstruction created by the portion 40 of the second closure door 24 is sufficient to prevent movement of the handle member 28 to the degree necessary to release the first door latch 16 from the frame 18 when the second closure door 24 is in the at least partially latched position.

The force transmission assembly 32 can include a latch-actuating cable 44 extending between the handle member 28 and the first door latch 16. At least one member or portion 46 of the force transmission assembly 32 can extend outwardly from the axis of movement of the handle member 28. As illustrated in FIGS. 1-3, the at least one member 46 can support a pulley 48 mounted for rotation with respect to an axis generally perpendicular to the axis of movement of the handle member 28. The pulley 48 can be connected to an end of the latch-actuating cable 44. An actuating rod or member 50 can extend between the handle member 28 and the pulley 48 for transmitting motion to the pulley 48, and to the connected latch-actuating cable 44, in response to movement of the handle member 28 about the axis of movement. When the inboard or interior portion 30 of the handle member 28 is pulled to rotate the handle member 28 about the axis of movement, the handle rotates in the a counter clockwise direction as illustrated in FIG. 3 about the pivot pin or shaft 52. The counter clockwise movement of the handle member 28 about the pivot pin or shaft 52 drives the actuating rod or member 50 in a direction extending to the right as illustrated in FIGS. 1 and 3. As best seen in FIG. 1, as the actuating rod or member 50 is driven in the right hand direction, the actuating rod or member 50 through its connection with the pulley 48 drives the pulley 48 in clockwise rotation about a pivot pin or shaft 54 supporting the pulley 48 for movement, Clockwise rotation of the pulley 48 illustrated in FIG. 1 causes the at least one latch-actuating cable 44 to be drawn in an appropriate direction in order to move the at least one door latch 16 from the latch-engaged position 34 schematically shown in solid line, to the latch-released position 36 schematically shown in phantom, allowing the first closure door 14 to be released from the at least partially latched position for movement toward the opened position.

Figure 4:
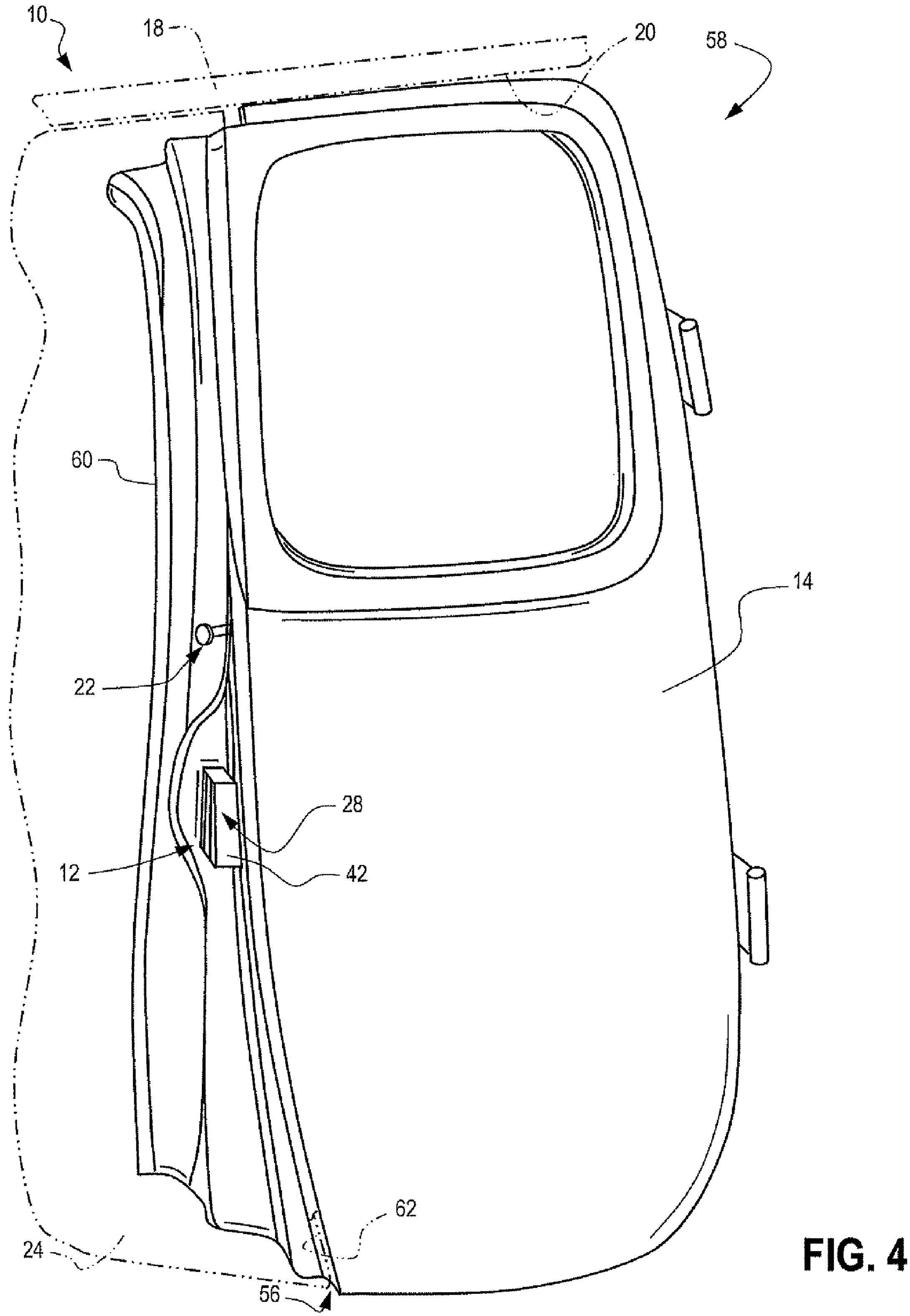
FIG. 4 is a elevational view of a portion of a dual door assembly including a first closure door for a vehicle including an interior door release apparatus or handle according to another embodiment of the present invention.
Figure 5:
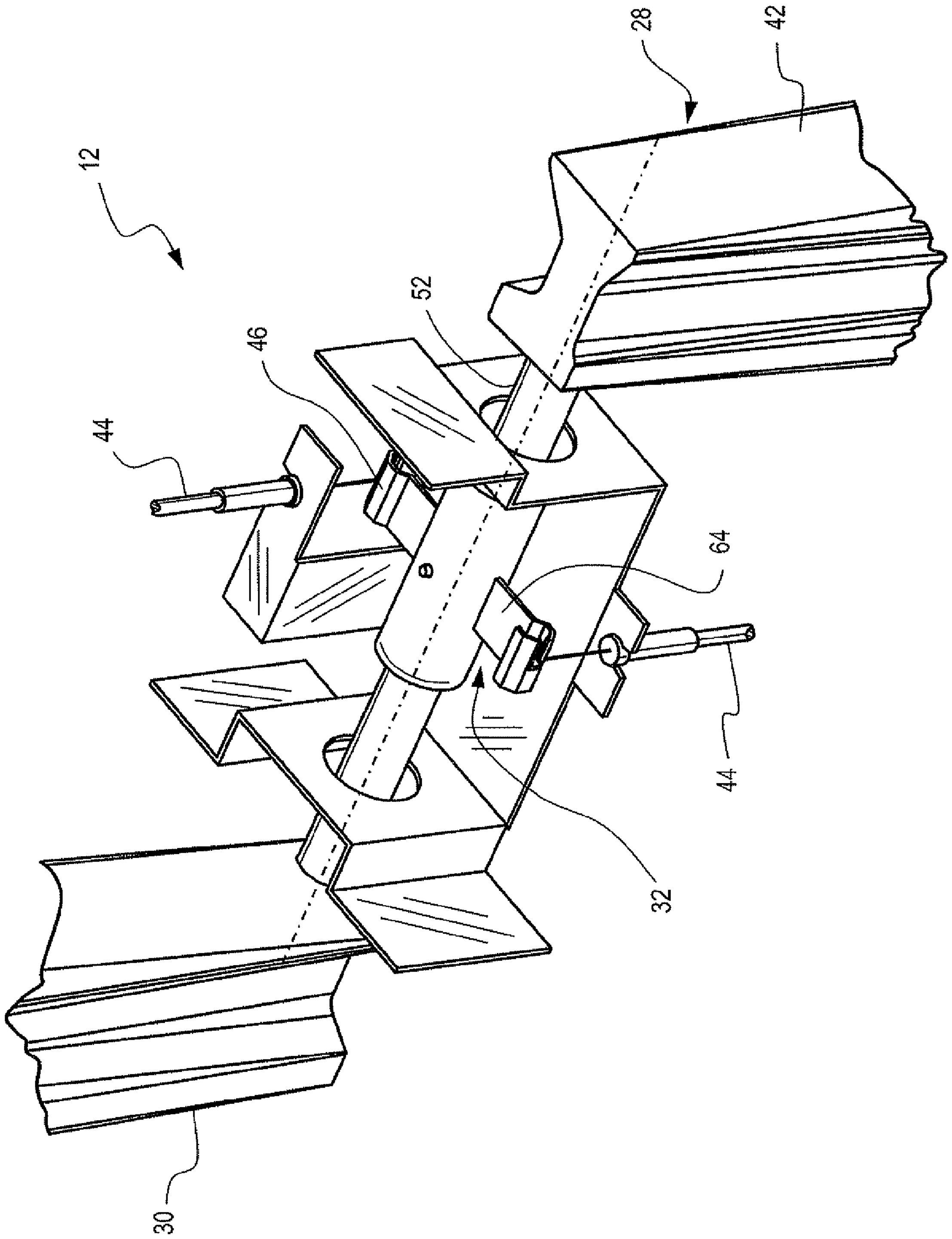
FIG. 5 is a perspective view of the interior door release handle illustrated in FIG. 4.
Figure 6:
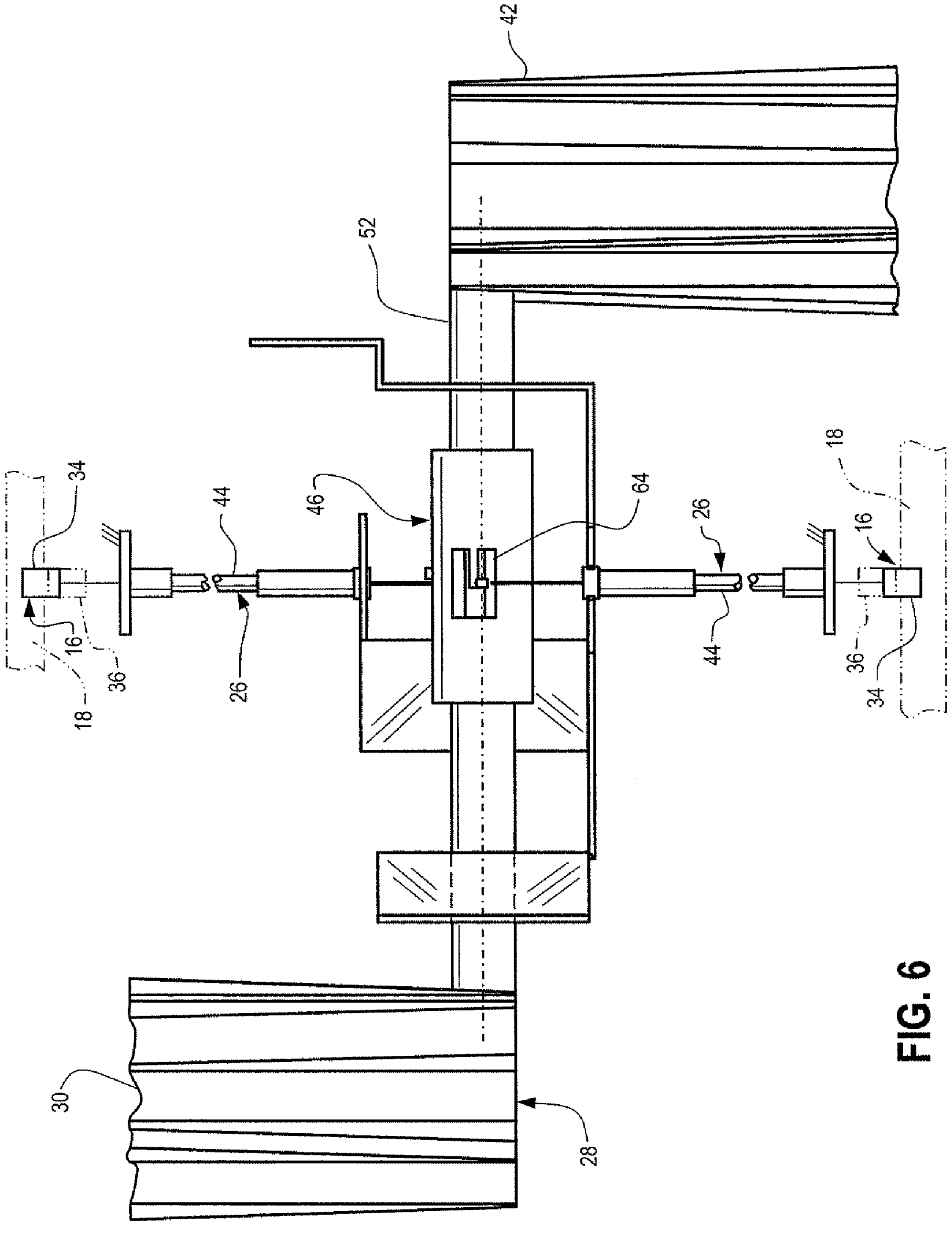
FIG. 6 is a side elevational view of the interior door release handle illustrated in FIGS. 4 and 5.

Referring now to FIGS. 4-6, an interior door release apparatus or handle 12 for a dual door assembly 56 is provided through a vehicle body passage opening 20 defined by a frame 18 through a barrier wall 58 of a vehicle 10. The dual door assembly 56 can have first and second closure doors 14, 24 barring traffic through the passage opening 20 and being mounted to opposite sides of the frame 18 for independent movement between opened and closed positions. Distal ends 60, 62 of the first and second closure doors 14, 24 are engagable in sealed relationship with respect to one another when in the closed position. The first closure door 14 can have at least one latch 16 engagable with the frame 18 and supports a door latch 22 for engagement by the second closure door 24. The interior door release handle 12 can include a handle member 28 having at least an inboard or interior portion 30. The handle member 28 is mounted to the first closure door 14 for movement about an axis between first and second position. A force transmission assembly 32 is operably engaged with the handle member 28 for movement in response to movement of the handle member 28. The force transmission assembly 32 is movable between a latch-engaged position 34 and a latch-released position 36 for operating the at least one latch 16 of the first closure door 14 with respect to the frame 18. An integrated first door release lock-out 38 is defined by a portion 40 of the second closure door 24 directly obstructing movement of the handle member 28 when the second closure door 24 is in the at least partially latched position. The integrated first door released lock-out 38 prevents movement of the handle member 28 to a degree sufficient in order to move the force transmission assembly 32 from the latch-engaged position 34 to the latch-released position 36, thereby preventing the first door latch 16 from being released from the frame 18 of the vehicle 10 when the second closure door 24 is in the at least partially latched position.

The inboard or interior portion 30 of the handle member 28 is operable from within the vehicle 10 to unlatch the first door latch 16 holding the first closure door 14 in the closed position. The handle member 28 is only rotatable to a degree sufficient in order to unlatch the first door latch 16 when the second closure door 24 is in the opened position. The handle member 28 can also include an outboard or exterior portion 42 operable from external of the vehicle 10 to unlatch the first door latch 16 of the first closure door 14 when the second closure door 24 is in the opened position. The handle member 28 can be mounted with respect to the first closure door 14 for movement about an axis extending generally horizontally with respect to the vehicle 10 as illustrated in FIGS. 4-7, or can have an axis of movement extending generally vertically with respect to the vehicle 10 as illustrated in FIGS. 1-3, or any desired angular orientation therebetween for the configuration illustrated in either FIGS. 1-3 or FIGS. 4-7 provided that the integrated first door release lock-out 38 is defined by a portion 40 of the second closure door 24 directly obstructing movement of the handle member 28 when the second closure door 24 is in the at least partially latched position. The integrated first door release lock-out 38 preventing movement of the handle member 28 from occurring to a degree sufficient to move the force transmission assembly 32 from the latch-engaged position 34 to the latch-released position 36, thereby preventing the first door latch 16 from being released from the frame 18 of the vehicle 10 when the second door 24 is in the at least partially latched position.

Figure 7:
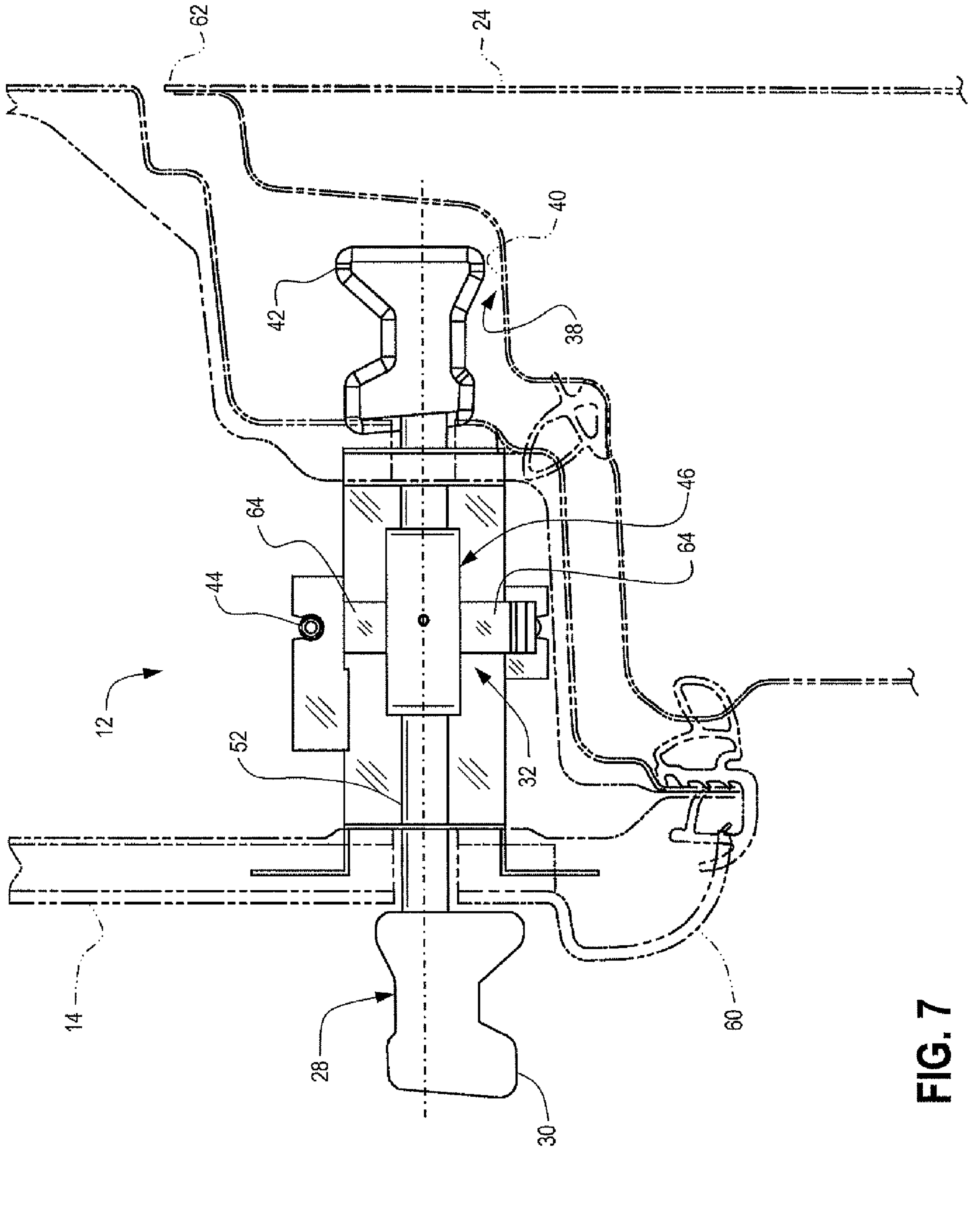
FIG. 7 is a plan view of the interior door release handle illustrated in FIGS. 4-6.

The force transmission assembly 32 can include a latch-actuating cable 44 extending between the handle member 28 and the first door latch 16. The force transmission assembly 32 can include at least one member or portion 46 extending outwardly from the axis of movement of the handle member 28. The at least one member or portion 46 can include pulley 48 as illustrated in FIGS. 1-3, or bracket 64 is illustrated in FIGS. 4-7. The at least one member 46, such as pulley 48 or bracket 64, rotates in response to movement of the handle member 28 about the axis of movement, and is connected to an end of the latch-actuating cable 44. As best seen in FIG. 5, when the handle member 28 is rotated about the axis of movement, the bracket 64 rotates in a clockwise direction about the axis of movement of the handle when viewed from the right hand side of FIG. 5 as illustrated. The bracket 64 is connected to an end of the latch-actuating cable 44. As best seen in FIGS. 5 and 6, as the bracket 64 rotates, the latch-actuating cable 44 moves the first door latch 16 from the latch-engaged position 34 shown in solid line, to the latch-released position 36 shown in phantom line in order to release the first closure door 14 from the latched position with respect to the frame 18 of the vehicle 10. As best seen in FIG. 7, movement of the handle member 28 is prevented when the second closure door 24 is in the at least partially latched position. The first door release lock-out 38 is defined by the portion 40 of the second closure door 24 directly obstructing movement of the handle member 28, so that the handle member 28 is unable to rotate a sufficient amount in order to move the force transmission assembly 32 from the latch-engaged position 34 to the latch-released position 38. As is conventional, the at least one first door latch 16 is biased toward the latch-engaged position 34 in any desired known manner, by way of example and not limitation, such as by a spring not shown in the drawings.

A vehicle dual door assembly 56 as illustrated in FIGS. 1-3 or FIGS. 4-7 includes first and second closure doors 14, 24 for barring traffic through a passage opening 20 defined by a frame 18 through a barrier wall 58 of a vehicle 10. The first and second closure doors 14, 24 are mountable to opposite sides of the frame 18 for independent movement between opened and closed positions. Distal ends 60, 62 of the first and second closure doors 14, 24 are engagable in sealed relationship with respect to one another when in the closed position. The first closure door 14 can have at least one latch 16 engagable with the frame 18. The first closure door 14 supports a door latch 22 for the second closure door 24. A handle member 28 can have at least inboard or interior portion 30. The handle member 28 is mounted to the first closure door 14 for movement about an axis between first and second positions. A force transmission assembly 32 is operably engaged with the handle member 28 for movement in response to movement of the handle member 28. The force transmission assembly 32 is movable between a latch-engaged position 34 and a latch-released position 36 for operating the at least one latch 16 of the first door closure 14 with respect to the frame 18. An integrated first door release lock-out 38 is defined by a portion 40 of the second closure door 24 directly obstructing movement of the handle member 28 when the second door 24 is in the at least partially latched position. The integrated first door release lock-out 38 prevents movement of the handle member 28 by a sufficient amount in order to move the force transmission assembly 32 from the latch-engaged position 34 to the latch-released position 36, thereby preventing the first door latch 16 from being released from the frame 18 of the vehicle 10 when the second closure door 24 is in the at least partially latched position.

The inboard or interior portion 30 of the handle member 28 is operable from within the vehicle 10 to unlatch the first door latch 16 from the frame 18 when the second closure door 24 is in the opened position. The handle member 28 can include an outboard or exterior portion 42 operable from external of the vehicle 10 to unlatch the first door 14 when the second door is in the opened position. The handle member 28 is mounted to the first closure door 14 for movement about an axis extending generally horizontally with respect to the vehicle 10, or with respect to an axis extending generally vertical with respect to the vehicle 10, or to an axis extending to any desired angle therebetween with respect to the vehicle 10 provided that the integrated first door release lock-out 38 is defined by a portion 40 of the second closure door 24 directly obstructing movement of the handle member 28 when the second closure door 24 is in the at least partially latched position.

The force transmission assembly 32 can include a latch-actuating cable 44 extending between handle member 28 and the first door latch 16. The force transmission assembly can include at least one member or portion 46 extending outwardly from the axis of movement of the handle member 28. The at least one member 46 can include a pulley 48 as illustrated in FIGS. 1-3, or a bracket 64 as illustrated in FIGS. 4-7. The at least one member 46 can rotate in response to movement of the handle member 28 about an axis of movement and can be connected to an end of the latch-actuating cable 44. As illustrated in FIGS. 1-3, the at least one member 46 can include pulley 48 mounted for rotation with respect to an axis generally perpendicular to the axis of movement of the handle member 28. The pulley 48 can be rotatable in response to movement of the handle 28 about the axis. The pulley 48 is connected to an end of the latch-actuating cable 44 such that in response to movement of the handle member 28, the pulley 48 is driven in movement causing the latch-actuating cable 44 to move the first door latch 16 from the latch-engaged position 34 to the latch-release position 36. The first door latch 16 is biased toward the latch-engaged position 34 by any suitable manner known to those skilled in the art, by way of example and not limitation, such as a compression spring. As illustrated in FIGS. 4-7, the at least one member 46 can include bracket 64 for rotation with respect to the axis of movement of the handle member 28. The bracket 64 is connected to an end of the latch-actuating cable 44 and is rotatable with response to movement of the handle 28 about the axis of movement, The bracket 64 causes the latch-actuating cable 44 to move the first door latch 16 from the latch-engaged position 34 to the latch-released position 36 in order to release the first closure door 14 from the at least partially latched position allowing movement to the open position. The first door latch 16 is biased toward the latch-engaged position 34 by any suitable means known to those skilled in the art. By way of example and not limitation, the suitable means for biasing the first door latch 16 toward the latch-engaged position can include a coil compression spring, In either the configuration illustrated in FIGS. 1-3, or FIGS. 4-7, the present invention includes a door release lock-out 38 defined by a portion 40 of the second closure door 24 directly obstructing movement of the handle member 28 when the second door 24 is in the at least partially latched position. The door release lock-out prevents movement of the handle member 28 a sufficient angular amount in order to release the first door latch 16 while the second closure door 24 is in the at least partially latched position, A portion of the handle 28 engages the obstructing portion 40 of the second closure door 24 when the second closure door is in the at least partially latched position, when an attempt is made to operate the handle member 28. The present embodiments disclose rotational movement of the handle assembly about a horizontal or vertical axis as illustrated in FIGS. 1-7. However, other types of movement of the handle may be used, such as angled rotational movement, diagonal movement, translational movement, multi-directional movement, a combination of rotational movements and translational movements, and any combinations thereof.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle having a door release apparatus for a first door, the first door supporting a door latch for a second door, the first door having a first door latch for connecting the first door with respect to a frame defining a vehicle body opening, the door release apparatus being connected with the first door latch, the vehicle door release -apparatus comprising:

a handle member having an interior portion and an exterior portion, the handle member mounted to the first door for movement of the interior and exterior portions about a common axis between first and second positions, wherein the interior portion and the exterior portion of the handle member are fixedly coupled together such that when the interior portion is moved, the exterior portion is also moved;

a force transmission member operably engaged between the handle member and the first door latch for movement in response to movement of the handle member, the force transmission member movable between a latch-engaged position and a latch-released position; and a first door release lock-out defined by a portion of the second door directly obstructing movement of the interior portion of the handle member, when the second door is in the latch-engaged position, to prevent sufficient movement of the exterior portion of the handle member from releasing of the first door latch.

2. The vehicle door release apparatus of claim 1, wherein the interior portion of the handle member is operable from within the vehicle to unlatch the first door when the second door is open.

3. The vehicle door release apparatus of claim 1, wherein the exterior portion is operable from external of the vehicle to unlatch the first door when the second door is open.

4. The vehicle door release apparatus of claim 1, wherein the axis of movement of the handle member extends generally horizontally with respect to the vehicle.

5. The vehicle door release apparatus of claim 1, wherein the axis of movement of the handle member extends generally vertically with respect to the vehicle.

6. The vehicle door release apparatus of claim 1, wherein the force transmission member includes a latch actuating cable extending between the handle member and the first door latch.

7. The vehicle door release apparatus of claim 1, wherein the force transmission member includes at least one member extending outwardly from the axis of movement of the handle member.

8. The vehicle door release apparatus of claim 7, wherein the force transmission member includes at least one latch actuating cable extending between the handle member and the first door latch, and the at least one member rotates in response to movement of the handle member about the axis and is connected to an end of the latch actuating cable.

9. The vehicle door release apparatus of claim 7, wherein the force transmission assembly includes at least one latch actuating cable extending between the handle member and the first door latch, the at least one member supports a pulley for rotation with respect to an axis generally perpendicular to the axis of movement of the handle member, the pulley connected to an end of the latch actuating cable, and a rod extending between the handle member and the pulley for transmitting motion to the pulley and latch actuating cable in response to movement of the handle member about the axis of movement.

10. The vehicle door release apparatus of claim 1, wherein movement of the handle member about an axis is rotational movement.

11. The vehicle door release apparatus of claim 1, wherein movement of the handle member about an axis is selected from a group of movements consisting of rotational movement, diagonal movement, translational movement, multi-directional movement, a combination of rotational movements and translational movements, and any combination thereof.

12. An interior door release handle for a dual door assembly through a passage opening defined by a frame through a barrier wall of a vehicle, the dual door assembly having first and second closure doors barring traffic through the passage opening and being mounted to opposite sides of the frame for independent movement between opened and closed positions, distal ends of the first and second closure doors engagable in sealed relationship with respect to one another in the closed position, the first closure door having at least one latch engagable with the frame and supporting a door latch for the second closure door, the interior door release handle comprising:

a handle member having an interior portion and an exterior portion, the handle member mounted to the first closure door for movement of the interior and exterior portions between first and second positions, wherein the interior portion is operable from an interior of the vehicle and the exterior portion is operable from outside of the vehicle, wherein the interior portion and the exterior portion of the handle member are fixedly coupled together such that when the interior portion is moved, the exterior portion is also moved; and a release mechanism configured to unlatch the first closure door from the frame in response to the handle member, wherein when the first and second closure doors are in the closed position, the exterior portion of the handle member is configured to contact the second closure door to prevent movement of the interior portion of the handle member between the first and second positions.

13. The interior door release handle of claim 12, wherein the interior portion of the handle member is operable from within the vehicle to unlatch the first door when the second door is open.

14. The interior door release handle of claim 12, wherein the exterior portion is operable from external of the vehicle to unlatch the first door when the second door is open.

15. The interior door release handle of claim 12, wherein an axis of movement of the handle member extends generally horizontally with respect to the vehicle.

16. The interior door release handle of claim 15, wherein the release mechanism includes a latch actuating cable extending between the handle member and the at least one latch engagable with the frame.

17. The interior door release handle of claim 16, wherein the release mechanism includes at least one member extending outwardly from the axis of movement of the handle member.

18. The interior door release handle of claim 17, wherein the at least one member rotates in response to movement of the handle member about the axis and is connected to an end of the latch actuating cable.

19. The interior door release handle of claim 12, wherein the axis of movement of the handle member extends generally vertically with respect to the vehicle.

20. The interior door release handle of claim 12, wherein the release mechanism includes at least one latch actuating cable extending between the handle member and the at least one latch engagable with the frame.

21. The interior door release handle of claim 20, wherein the release mechanism includes at least one member extending outwardly from an axis of movement of the handle member.

22. The interior door release handle of claim 21, wherein the at least one member supports a pulley for rotation with respect to an axis generally perpendicular to the axis of movement of the handle member, the pulley rotatable in response to movement of the handle member about the axis, and the pulley connected to an end of the latch actuating cable.

23. The interior door release handle of claim 21, wherein movement of the handle member about an axis is rotational movement.

24. The interior door release handle of claim 21, wherein movement of the handle member about an axis is selected from a group of movements consisting of rotational movement, diagonal movement, translational movement, multidirectional movement, a combination of rotational movements and translational movements, and any combination thereof.

25. The interior door release handle of claim 12, wherein the exterior portion of the handle member is configured to contact a part of an edge of the second closure door proximate the distal end.

26. The vehicle door release apparatus of claim 1, wherein the first door release lock-out is defined by a portion of the second door that is parallel to an outer surface of the second door.

27. The vehicle door release apparatus of claim 1, wherein the first door release lock-out is defined by a portion of the second door that is normal to an outer surface of the second door.

28. The interior door release handle of claim 12, wherein the exterior portion of the handle member is configured to contact a portion of the second closure door that is parallel to an outer surface of the second closure door to prevent movement of the interior portion of the handle member between the first and second positions.

29. The interior door release handle of claim 12, wherein the exterior portion of the handle member is configured to contact a portion of the second closure door that is normal to an outer surface of the second closure door to prevent movement of the interior portion of the handle member between the first and second positions.

* * * * *